United States Patent
Kimura

Patent Number: 5,951,958
Date of Patent: Sep. 14, 1999

[54] METHOD FOR THE PREPARATION OF RARE EARTH PHOSPHATE OF LOW OVERSTOICHIOMETRIC PHOSPHOROUS CONTENT

[75] Inventor: Yuji Kimura, Fukui-ken, Japan

[73] Assignee: Shin-Etsu Chemical Co., Ltd., Tokyo, Japan

[21] Appl. No.: 08/888,757

[22] Filed: Jul. 7, 1997

[30] Foreign Application Priority Data

Jul. 10, 1996 [JP] Japan ..................... 8-180460

[51] Int. Cl.$^6$ .......................................... C01F 17/00
[52] U.S. Cl. ........................... 423/263; 252/301.4 P
[58] Field of Search ................................ 423/263

[56] References Cited

U.S. PATENT DOCUMENTS

| | | | |
|---|---|---|---|
| 5,518,703 | 5/1996 | Dissaux et al. | 423/263 |
| 5,562,889 | 10/1996 | Collin et al. | 423/263 |

FOREIGN PATENT DOCUMENTS 0685549  12/1995  European Pat. Off. .

OTHER PUBLICATIONS

Derwent Publications Ltd., Class L03, AN 77–01612Y, XP002043927 & SU 513,068 (Bredenfeld NV) May 21, 1976.

Patent Abstracts of Japan, vol. 009, No. 247, Oct. 3, 1985 & JP 60–103,008 A (Daiichi Kigenso Kagaku Kogyo KK), Jun. 7, 1985.

Derwent Publications Ltd., Class L03, AN 95–220929, XP002043959 & JP 07–133,485A (Toshiba Denshi Eng KK), May 23, 1995.

*Primary Examiner*—Wayne Langel
*Attorney, Agent, or Firm*—McAulay Nissen Goldberg Kiel & Hand, LLP

[57] ABSTRACT

While a rare earth phosphate prepared by a conventional precipitation method by mixing an aqueous phosphoric acid solution and an aqueous solution of a rare earth salt usually contains an overstoichiometric amount of phosphorus, which is detrimental against luminescent phosphors prepared from the rare earth phosphate, the invention provides a method for the preparation of a rare earth phosphate of a greatly decreased overstoichiometric phosphorus content. The inventive method comprises adding, to either one of the aqueous phosphoric acid solution and the aqueous solution of a rare earth salt, a small amount of oxalic acid or a water-soluble oxalate such as ammonium oxalate so as to effect coprecipitation of a rare earth oxalate with the rare earth phosphate followed by calcination of the oxalate-containing phosphate so as to convert the excess of phosphorus into the phosphate by the reaction with the rare earth oxide formed from the rare earth oxalate by calcination.

18 Claims, No Drawings

METHOD FOR THE PREPARATION OF RARE EARTH PHOSPHATE OF LOW OVERSTOICHIOMETRIC PHOSPHOROUS CONTENT

BACKGROUND OF THE INVENTION

The present invention relates to a method for the preparation of a rare earth phosphate of low overstoichiometric phosphorus content or, more particularly, to a method for the preparation of a rare earth phosphate of which the content of phosphorus in excess of stoichiometry, i.e. equimolar contents of phosphorus and the rare earth element, can be greatly decreased in a precipitation reaction by mixing an aqueous solution of a rare earth salt and an aqueous phosphoric acid solution.

As is well known, several kinds of mixed rare earth phosphates are useful as a base material in the preparation of luminescent phosphors for cathode ray tubes (see, for example, U.S. Pat. No. 3,507,804). A composite phosphate of lithium, neodymium and ytterbium is useful as a base material of infrared-emitting phosphors (Japanese Patent Kokai 53-60888). Lanthanum orthophosphate of the monoclinic crystalline system activated with cerium and terbium is used as a base material of phosphors in three-band fluorescent lamps (U.S. Pat. No. 3,634,282 and Japanese Patent Kokai 54-56086).

As is readily understood, rare earth phosphates in general can be prepared by utilizing the method of precipitation in which an aqueous solution of phosphoric acid and an aqueous solution of a water-soluble rare earth salt are blended together so that the rare earth phosphate is formed in the form of precipitates which are recovered from the aqueous precipitation medium and dried and calcined.

It is known that the content of phosphorus in the rare earth phosphate obtained by the above mentioned precipitation method is usually in substantial excess over stoichiometry. When a phosphor for cathode ray tubes or fluorescent lamps is prepared from such a rare earth phosphate of overstoichiometric phosphorus content and the phosphor is used in the form of an aqueous slurry for coating, the excess of phosphorus in the phosphor is gradually leached out in the slurry to affect the stability of the organic binder usually contained in the slurry or hence the stability of the phosphor slurry eventually leading to gelation of the slurry. Further, the excess of phosphorus in the phosphor gradually reacts with the mercury in the fluorescent lamp to cause a decrease in the luminescent brightness of the phosphor. Incidentally, a deficiency in the content of phosphorus below stoichiometry is also undesirable in a rare earth phosphate used as a base material of phosphors because of the greatly decreased luminescent brightness of the phosphor prepared therefrom.

As a remedy for the above mentioned disadvantages due to the overstoichiometric phosphorus content in the rare earth phosphate, an improved method is proposed in Japanese Patent Kokai 5-171143 in which the rare earth phosphate containing an excess of phosphorus as prepared by the conventional method of precipitation and calcination is blended with an oxide of the same rare earth element or elements in combination in an amount equivalent to the overstoichiometric amount of phosphorus and the blend is subjected to a second calcination treatment so as to convert the excess of phosphorus into the phosphate. This method, however, cannot be fully effective in reducing the overstoichiometric phosphorus content in the rare earth phosphate presumably because mixing of two kinds of powders of, one, the rare earth phosphate and, the other, the rare earth oxide can never be intimate enough as an inherency in solid-solid mixing even by prolongedly continuing mixing.

SUMMARY OF THE INVENTION

The present invention accordingly has an object to provide an improved method for the preparation of a rare earth phosphate containing a greatly decreased overstoichiometric content of phosphorus by the precipitation of the rare earth phosphate from an aqueous phosphoric acid solution and an aqueous solution of a rare earth salt followed by calcination of the precipitates.

Thus, the method of the present invention for the preparation of a rare earth phosphate of a low overstoichiometric phosphorus content comprises, in a first aspect of the invention, the steps of:

(a1) adding an acidic aqueous solution of a water-soluble rare earth salt having a pH, preferably, in the range from 0.5 to 4 to an aqueous solution of phosphoric acid containing oxalic acid or a water-soluble oxalate under agitation to form precipitates of the rare earth phosphate in an aqueous medium;

(b) separating the precipitates from the aqueous precipitation medium; and (c) calcining the precipitates in an oxidizing atmosphere at a temperature in the range from 600 to 1300° C. for at least 0.5 hour.

Further, the method of the present invention for the preparation of a rare earth phosphate of a low overstoichiometric phosphorus content comprises, in a second aspect of the invention, the steps of:

(a2) adding an acidic aqueous solution of a water-soluble rare earth salt containing oxalic acid or a water-soluble oxalate and having a pH, preferably, in the range from 0.5 to 4 to an aqueous solution of phosphoric acid under agitation to form precipitates of the rare earth phosphate in an aqueous medium;

(b) separating the precipitates from the aqueous precipitation medium; and (c) calcining the precipitates in an oxidizing atmosphere at a temperature in the range from 600 to 1300° C. for at least 0.5 hour.

The method of the present invention is applicable to the preparation of phosphates of any rare earth elements including yttrium and the elements having atomic numbers of 57 through 71 either singly or as a combination of two kinds or more according to need.

DETAILED DESCRIPTION OF THE PREFERRED EMBODIMENTS

As is understood from the above given summarizing description, the present invention provides an improvement in the prior art method for the preparation of a rare earth phosphate in which the rare earth phosphate is precipitated in an aqueous medium by mixing an acidic aqueous solution of a water-soluble rare earth salt and an aqueous solution of phosphoric acid under agitation followed by recovery of the precipitates from the aqueous precipitation medium and calcination of the precipitates at a specified temperature to give the desired rare earth phosphate of a greatly decreased overstoichiometric phosphorus content.

The novel and unexpected discovery leading to the present invention is that, when either of the acidic aqueous solution of a water-soluble rare earth salt and the aqueous solution of phosphoric acid mixed together under agitation in the above mentioned basic process contains an appropriate amount of oxalic acid or a water-soluble oxalate dissolved therein, the rare earth phosphate obtained by the precipitation and calcination contains a greatly decreased overstoichiometric amount of phosphorus. The mechanism leading to this unexpected advantage is presumably that coprecipitation of the rare earth oxalate with the rare earth phosphate takes place to form composite precipitates of oxalate-containing rare earth phosphate and, by the calcination thereof, the rare earth oxalate is converted in situ into the corresponding rare earth oxide which reacts with the excess amount of phosphorus to be converted into the rare earth phosphate.

Different from the prior art method involving the step of powder blending of phosphate and oxide of a rare earth element, the above described inventive method is absolutely free from the problem due to non-uniformity of powder blending because the rare earth oxide is formed in situ in the composite precipitates of phosphate and oxalate formed by coprecipitation from uniform aqueous solutions. It is of course optional that both of the phosphoric acid solution and the rare earth salt solution contain oxalic acid or a water-soluble oxalate but a full improvement as desired can be obtained even when either one of the solutions only contains oxalic acid or an oxalate.

The form of oxalic acid to be dissolved in the aqueous solution of phosphoric acid or rare earth salt is not particularly limitative and the oxalic acid can be in the form of anhydrous acid or in the form of dihydrate crystals. Oxalic acid is selected as the reactant with the rare earth ions because a rare earth oxalate derived therefrom, which must be converted into the oxide by thermal decomposition, is readily obtained by the precipitation reaction and is relatively stable in an acidic aqueous medium. An equivalent effect can be obtained by the addition of a water-soluble oxalate in place of oxalic acid. Examples of a water-soluble oxalate include ammonium oxalate and oxalates of alkali metals such as sodium and potassium, of which ammonium oxalate is preferred because the resultant phosphate product is free from contamination with an alkali metal detrimental in most applications.

The amount of oxalic acid or oxalate to be dissolved in either one of the aqueous solutions is, as a rough measure, in the range from 1.5 to 15% by moles relative to the amount of the rare earth element or elements in consideration of the fact that the phosphorus to rare earth molar ratio in a conventional rare earth phosphate product is usually in the range from 1.01 to 1.10 though dependent on various process conditions including the conditions of the precipitation reaction and water-washing of the precipitates. A recommendable way, therefore, is that a preliminary test run is undertaken throughout the procedure of precipitation to calcination with omission of addition of oxalic acid or an oxalate to the aqueous solutions and the thus obtained rare earth phosphate is analyzed for the con-tent of phosphorus so that the overstoichiometric amount of phosphorus is determined and the amount of oxalic acid or oxalate is adjusted to be equivalent to the thus determined excess amount of phosphorus which should be converted into the rare earth phosphate through the rare earth oxalate.

In conducting the precipitation reaction by mixing an aqueous phosphoric acid solution and an acidic aqueous rare earth salt solution, the molar ratio of phosphoric acid to the rare earth element is in the range from 1.5 to 5.0 or, preferably, from 2.0 to 3.0. Since the yield of the rare earth phosphate is increased by increasing the amount of phosphoric acid relative to the rare earth element, the yield of the rare earth phosphate would be unacceptably low when this molar ratio is smaller than 1.5 while no further improvement can be obtained in the yield of the phosphate by increasing the amount of phosphoric acid to exceed the above mentioned upper limit.

It is also desirable that the concentrations of phosphoric acid and the rare earth salt in the respective aqueous solutions and the volumes thereof are so adjusted that the amount of the rare earth element contained in the precipitation mixture including the aqueous medium and the precipitates formed by mixing the two solutions does not exceed 0.1 mole per liter irrespective of the types of the rare earth salt. This is because the yield of the rare earth phosphate precipitates is decreased when the volume of the reaction mixture is too small and the yield would be unacceptably low when the rare earth content in the reaction mixture exceeds 0.1 mole per liter. The water-soluble rare earth salt is selected preferably from chlorides and nitrates, of which nitrates are preferred. When a mixed rare earth phosphate, such as cerium-terbium, neodymium-ytterbium and lanthanum-cerium-terbium phosphates, is desired, the respective chlorides or nitrates of the rare earth elements are jointly dissolved in water. The lithium-neodymium-ytterbium composite phosphate can be prepared by the solid-state reaction of a neodymium-ytterbium mixed phosphate, a lithium compound and ammonium phosphate according to a known procedure.

The temperature at which the precipitation reaction of the rare earth phosphate is conducted is not particularly limitative. It is preferable, however, that the reaction mixture either during or after mixing of the two aqueous solutions is at least once brought up to a temperature of 70° C. or higher or at a temperature in the range from 70° C. to the boiling point of the mixture in order to accomplish an acceptably high yield of the rare earth phosphate product.

The precipitates of the rare earth phosphate possibly containing the rare earth oxalate are then separated from the aqueous precipitation medium by a suitable solid-liquid separation means such as filtration followed by thorough washing with water which is undertaken under the same conditions as in the above mentioned preliminary test run conducted with omission of oxalic acid or an oxalate. The precipitates of the rare earth phosphate after washing with water and drying are then subjected to calcination in an oxidizing atmosphere such as air at a temperature in the range from 600 to 1300° C. or, preferably, from 600 to 1000° C. for a length of time of, for example, at least 0.5 hour to effect thermal decomposition of the rare earth oxalate to the oxide and reaction of the oxide thus formed in situ with the excess of phosphorus which is converted to the rare earth phosphate. When the calcination temperature is too low, the phosphate product would contain unreacted materials while, when the temperature is too high, agglomeration of the phosphate particles by sintering takes place.

While the molar ratio of phosphorus to rare earth element or elements in conventional rare earth phosphate products sometimes exceeds 1.05 with a 5% excess over stoichiometry, the method of the present invention is so effective that a rare earth phosphate product having the phosphorus to rare earth molar ratio not exceeding 1.02 can readily be obtained. Accordingly, the requirement that the rare earth phosphate as a base material of phosphors should have the molar ratio in the range from 1.00 to 1.02 can readily be satisfied.

In the following, the method of the present invention is illustrated in more detail by way of Examples, which, however, never limit the scope of the invention in any way.

EXAMPLE 1

A powder of gadolinium phosphate was prepared according to the first aspect of the inventive method. Thus, 8.0 mmoles of oxalic acid were dissolved in 500 ml of an aqueous phosphoric acid solution in a concentration of 0.4 mole/liter and the solution was kept at 85° C. Separately, 500 ml of an aqueous solution of gadolinium nitrate in a concentration of 0.15 mole/liter were prepared and kept at 85° C. The above mentioned amount of oxalic acid was selected in consideration of the preliminary test run undertaken by the same procedure as described here excepting for the omission of addition of oxalic acid, according to which the phosphorus to gadolinium molar ratio in the phosphate product was 1.071. The gadolinium nitrate solution having a pH of 1.5 was added to the phosphoric acid solution under agitation over a period of 2 minutes to effect precipitation of gadolinium phosphate. The precipitates of gadolinium phosphate were collected by filtration under suction and washed with 1 liter of deionized water. After drying, the precipitates of gadolinium phosphate were taken in a crucible and calcined in air at 700° C. for 2 hours.

The elementary analysis conducted for the contents of phosphorus and gadolinium in the thus obtained gadolinium phosphate indicated that the molar ratio of phosphorus to gadolinium was 1.015, i.e. 1.5% over stoichiometry. The yield of the gadolinium phosphate product was 95% of the theoretical value.

EXAMPLE 2

A powder of yttrium phosphate was prepared according to the second aspect of the inventive method. Thus, 500 ml of an aqueous phosphoric acid solution in a concentration of 0.4 mole/liter was prepared and kept at 85° C. Separately, 10 mmoles of oxalic acid were dissolved in 500 ml of an aqueous solution of yttrium nitrate in a concentration of 0.15 mole/liter and the solution was kept at 85° C. The above mentioned amount of oxalic acid was selected in consideration of the phosphorus to yttrium molar ratio of 1.089 in the phosphate product obtained in a preliminary test run. The yttrium nitrate solution having a pH of 1.2 was added to the phosphoric acid solution under agitation over a period of 2 minutes to effect precipitation of yttrium phosphate. The precipitates of yttrium phosphate were collected by filtration under suction and washed with 1 liter of deionized water. After drying, the precipitates of yttrium phosphate were taken in a crucible and calcined in air at 700° C. for 2 hours.

The elementary analysis conducted for the contents of phosphorus and yttrium in the thus obtained yttrium phosphate indicated that the molar ratio of phosphorus to yttrium was 1.005, i.e. 0.5% over stoichiometry. The yield of the yttrium phosphate product was 94% of the theoretical value.

EXAMPLE 3

A powder of lanthanum-cerium-terbium mixed phosphate was prepared according to the first aspect of the inventive method. Thus, 3.75 mmoles of oxalic acid were dissolved in 500 ml of an aqueous phosphoric acid solution in a concentration of 0.2 mole/liter and the solution was kept at 80° C. The above mentioned amount of oxalic acid was selected in consideration of the phosphorus to rare earth molar ratio of 1.050 in the phosphate product obtained in a preliminary test run. Separately, 500 ml of an aqueous solution of lanthanum-cerium-terbium nitrates in a total rare earth concentration of 0.1 mole/liter with a molar ratio lanthanum:cerium:terbium of 5:4:1 were prepared and kept at 80° C. The mixed rare earth nitrate solution having a pH of 2.0 was added to the phosphoric acid solution under agitation over a period of 1 minute to effect precipitation of mixed rare earth phosphate. The precipitates were collected by filtration under suction and washed with 1 liter of deionized water. After drying, the precipitates of mixed rare earth nitrate were taken in a crucible and calcined in air at 700° C. for 2 hours.

The elementary analysis conducted for the contents of phosphorus and the rare earth elements in the thus obtained mixed rare earth phosphate indicated that the molar ratio of phosphorus to the rare earth elements was 1.009, i.e. 0.9% over stoichiometry. The yield of the mixed rare earth phosphate product was 98% of the theoretical value. Incidentally, the yield of the mixed rare earth phosphate product obtained in the above mentioned preliminary test run was 99% of the theoretical value.

EXAMPLE 4

A powder of gadolinium phosphate was prepared in the following manner. Thus, 8.0 mmoles of oxalic acid were dissolved in 500 ml of an aqueous phosphoric acid solution in a concentration of 0.2 mole/liter and the solution was kept at 85° C. The above mentioned amount of oxalic acid was selected in consideration of the phosphorus to gadolinium molar ratio of 1.071 in the phosphate product obtained in a preliminary test run. Separately, 500 ml of an aqueous solution of gadolinium nitrate in a concentration of 0.15 mole/liter were prepared and kept at 85° C. The gadolinium nitrate solution having a pH of 1.2 was added to the phosphoric acid solution under agitation over a period of 2 minutes to effect precipitation of gadolinium phosphate. The precipitates of gadolinium phosphate were collected by filtration under suction and washed with 1 liter of deionized water. After drying, the precipitates of gadolinium phosphate were taken in a crucible and calcined in air at 700° C. for 2 hours.

The elementary analysis conducted for the contents of phosphorus and gadolinium in the thus obtained gadolinium phosphate indicated that the molar ratio of phosphorus to gadolinium was 1.010, i.e. 1.0% over stoichiometry. The yield of the gadolinium phosphate product was 85% of the theoretical value.

EXAMPLE 5

A powder of gadolinium phosphate was prepared in the following manner. Thus, 15 mmoles of oxalic acid were dissolved in 500 ml of an aqueous phosphoric acid solution in a concentration of 0.6 mole/liter and the solution was kept at 85° C. The above mentioned amount of oxalic acid was selected in consideration of the phosphorus to gadolinium molar ratio of 1.067 in the phosphate product obtained in a preliminary test run. Separately, 500 ml of an aqueous solution of gadolinium nitrate in a concentration of 0.3 mole/liter were prepared and kept at 85° C. The gadolinium nitrate solution having a pH of 0.9 was added to the phosphoric acid solution under agitation over a period of 2 minutes to effect precipitation of gadolinium phosphate. The precipitates of gadolinium phosphate were collected by filtration under suction and washed with 1 liter of deionized water. After drying, the precipitates of gadolinium phosphate were taken in a crucible and calcined in air at 700° C. for 2 hours.

The elementary analysis conducted for the contents of phosphorus and gadolinium in the thus obtained gadolinium phosphate indicated that the molar ratio of phosphorus to gadolinium was 1.010, i.e. 1.0% over stoichiometry. The yield of the gadolinium phosphate product was 70% of the theoretical value.

EXAMPLE 6

A powder of gadolinium phosphate was prepared in the following manner. Thus, 8.0 mmoles of oxalic acid were dissolved in 500 ml of an aqueous phosphoric acid solution in a concentration of 0.4 mole/liter and the solution was kept at 60° C. The above mentioned amount of oxalic acid was selected in consideration of the phosphorus to gadolinium molar ratio of 1.053 in the phosphate product obtained in a preliminary test run. Separately, 500 ml of an aqueous solution of gadolinium nitrate in a concentration of 0.2 mole/liter were prepared and kept at 60° C. The gadolinium nitrate solution having a pH of 1.0 was added to the phosphoric acid solution under agitation over a period of 2 minutes to effect precipitation of gadolinium phosphate. The precipitates of gadolinium phosphate were collected by filtration under suction and washed with 1 liter of deionized water. After drying, the precipitates of gadolinium phosphate were taken in a crucible and calcined in air at 700° C. for 2 hours.

The elementary analysis conducted for the contents of phosphorus and gadolinium in the thus obtained gadolinium phosphate indicated that the molar ratio of phosphorus to gadolinium was 1.005, i.e. 0.5% over stoichiometry. The yield of the gadolinium phosphate product was 75% of the theoretical value.

What is claimed is:

1. A method for the preparation of a rare earth phosphate of a low overstoichiometric phosphorous content which comprises the steps of:
    (a1) adding, under agitation, an acidic aqueous solution of a water-soluble rare earth salt to an aqueous solution of phosphoric acid containing oxalic acid or a water-soluble oxalate dissolved therein to form precipitates of the rare earth phosphate in an aqueous medium;
    (b) separating the precipitates from the aqueous precipitation medium; and
    (c) calcinating the precipitates in an oxidizing atmosphere at a temperature in the range from 600 to 1300° C.;
    wherein the amount of the oxalic acid or water-soluble oxalate dissolved in the aqueous solution of phosphoric acid is in the range from 1.5 to 15% by moles based on the amount of the rare earth element in the acidic aqueous solution of the water-soluble rare earth salt.

2. The method for the preparation of a rare earth phosphate of a low overstoichiometric phosphorus content as claimed in claim 1 in which the water-soluble rare earth salt is a chloride or nitrate of the rare earth element.

3. The method for the preparation of a rare earth phosphate of a low overstoichiometric phosphorus content as claimed in claim 1 in which the molar ratio of the phosphoric acid in the aqueous solution of phosphoric acid to the rare earth element in the aqueous solution of a water-soluble rare earth salt is in the range from 1.5 to 5.0.

4. The method for the preparation of a rare earth phosphate of a low overstoichiometric phosphorus content as claimed in claim 3 in which the molar ratio of the phosphoric acid in the aqueous solution of phosphoric acid to the rare earth element in the aqueous solution of a water-soluble rare earth salt is in the range from 2.0 to 3.0.

5. The method for the preparation of a rare earth phosphate of a low overstoichiometric phosphorus content as claimed in claim 1 in which the mixture of the aqueous solution of phosphoric acid and the aqueous solution of a water-soluble rare earth salt is brought at least once up to a temperature of 70° C. or higher.

6. The method for the preparation of a rare earth phosphate of a low overstoichiometric phosphorus content as claimed in claim 1 in which the acidic aqueous solution of a water-soluble rare earth salt has a pH in the range from 0.5 to 4.

7. The method for the preparation of a rare earth phosphate of a low overstoichiometric phosphorus content as claimed in claim 1 in which the amount of the rare earth element in the aqueous medium after step (a1) does not exceed 0.1 mole per liter of the total volume of the aqueous medium and the precipitates.

8. The method for the preparation of a rare earth phosphate of a low overstoichiometric phosphorus content as claimed in claim 1 in which the oxidizing atmosphere in step (c) is air.

9. The method for the preparation of a rare earth phosphate of a low overstoichiometric phosphorus content as claimed in claim 1 in which the temperature of calcination in step (c) is in the range from 600 to 1000° C.

10. A method for the preparation of a rare earth phosphate of a low overstoichiometric phosphorous content which comprises the steps of:
    (a2) adding, under agitation, an acidic aqueous solution of a water-soluble rare earth salt containing oxalic acid or a water-soluble oxalate to an aqueous solution of phosphoric acid to form precipitates of the rare earth phosphate in an aqueous medium;
    (b) separating the precipitates from the aqueous precipitation medium; and
    (c) calcinating the precipitates in an oxidizing atmosphere at a temperature in the range from 600 to 1300° C.;
    wherein the amount of the oxalic acid or water-soluble oxalate dissolved in the aqueous solution of a water-soluble rare earth salt is in the range from 1.5 to 15% by moles based on the amount of the rare earth element in the acidic aqueous solution of the water-soluble rare earth salt.

11. The method for the preparation of a rare earth phosphate of a low overstoichiometric phosphorus content as claimed in claim 10 in which the water-soluble rare earth salt is a chloride or nitrate of the rare earth element.

12. The method for the preparation of a rare earth phosphate of a low overstoichiometric phosphorus content as claimed in claim 10 in which the molar ratio of the phosphoric acid in the aqueous solution of phosphoric acid to the rare earth element in the aqueous solution of a water-soluble rare earth salt is in the range from 1.5 to 5.0.

13. The method for the preparation of a rare earth phosphate of a low overstoichiometric phosphorus content as claimed in claim 12 in which the molar ratio of the phosphoric acid in the aqueous solution of phosphoric acid to the rare earth element in the aqueous solution of a water-soluble rare earth salt is in the range from 2.0 to 3.0.

14. The method for the preparation of a rare earth phosphate of a low overstoichiometric phosphorus content as claimed in claim 10 in which the mixture of the aqueous solution of phosphoric acid and the aqueous solution of a water-soluble rare earth salt is brought at least once up to a temperature of 70° C. or higher.

15. The method for the preparation of a rare earth phosphate of a low overstoichiometric phosphorus content as claimed in claim 10 in which the acidic aqueous solution of a water-soluble rare earth salt has a pH in the range from 0.5 to 4.

16. The method for the preparation of a rare earth phosphate of a low overstoichiometric phosphorus content as claimed in claim 10 in which the amount of the rare earth element in the aqueous medium after step (a2) does not exceed 0.1 mole per liter of the total volume of the aqueous medium and the precipitates.

17. The method for the preparation of a rare earth phosphate of a low overstoichiometric phosphorus content as claimed in claim 10 in which the oxidizing atmosphere in step (c) is air.

18. The method for the preparation of a rare earth phosphate of a low overstoichiometric phosphorus content as claimed in claim 10 in which the temperature of calcination in step (c) is in the range from 600 to 1000° C.

* * * * *